United States Patent Office 3,808,128
Patented Apr. 30, 1974

3,808,128
DRILLING MUD COMPOSITION FOR SHIELDING UNDERGROUND NUCLEAR EXPLOSIVE DEVICES
Richard A. Heckman, Castro Valley, Calif., assignor to the United States of America as represented by the United States Atomic Energy Commission
No Drawing. Filed May 11, 1972, Ser. No. 252,394
Int. Cl. E02d 31/00; C10m 3/04
U.S. Cl. 252—8.5 B     1 Claim

ABSTRACT OF THE DISCLOSURE

In underground nuclear explosive engineering applications, it is desirable to reduce the quantity of radioisotopes produced by neutron interaction with constituent elements of the surrounding soil. In order to effectively shield the surrounding soil, all void spaces around an emplaced underground nuclear device are filled with a drilling mud containing dissolved ammonium pentaborate as a neutron-absorbing shield.

BACKGROUND OF THE INVENTION

In general, reduction of the quantity of radioisotopes produced by neutron interaction with constituent elements of the surrounding soil is desirable. Particularly, it is desirable to reduce the amount of tritium generated by an underground nuclear device detonated in a gas-producing formation due to neutron interaction with trace amounts of lithium in the surrounding rock.

It is well known that the production of tritium and other radioisotopes resulting from neutron interaction can be minimized by surrounding the nuclear explosive device with a neutron-moderating and absorbing medium such as borated polyethylene. However, a conventional solid shield of such material would greatly increase the diameter of the explosive package, and hence a larger diameter hole would be required. Large diameter holes are extremely expensive, especially when drilling to depths greater than 1,000 feet. Typical alternative proposals involve underreaming or enlarging the emplacement section of the drill hole, positioning the explosive device in that section, and then introducing a flowable or liquid shielding material into the remaining volume.

Such alternative proposals have two basic defects: (1) unless the formation rock has high integrity, the underreamed section will collapse if not supported; and (2) unless contained, a liquid shielding material will migrate into the surrounding rock formation. Hence, it is necessary to create a vessel in the enlarged section of the drill hole which can withstand lithostatic formation pressures.

SUMMARY OF THE INVENTION

The object of the present invention is to provide a relatively inexpensive neutron-absorbing shield for underground nuclear explosive applications in order to reduce the quantity of radioisotopes produced by neutron interaction with constituent elements of the surrounding soil. The shielding material to be employed is ammonium pentaborate dissolved in a drilling mud composition. The resulting mud composition will have a relatively high concentration of boron, and since boron is a very good neutron-absorbing substance, with a high capture cross-section, the mud composition will provide an effective neutron shield around an underground nuclear device.

DESCRIPTION OF THE PREFERRED EMBODIMENT

A drilling mud composition is described for use as an inexpensive neutron absorbing material in underground nuclear explosive applications. Typical functions of drilling muds are: to clean the borehole of chips and cuttings and carry them to the surface; to lubricate the drill bit; to form a filter cake to seal and maintain the walls of the borehole and prevent formation damage; and to protect the surrounding formation in order that the wellbore may thereafter be successfully surveyed by known well-logging methods. In addition to the above functions, the drilling mud of the present embodiment has the capability of moderating and stopping neutron beams in order to effectively and inexpensively shield the surrounding soil.

The mud consists of a mixture of ammonium pentaborate and water, together with a jelling agent to increase viscosity. The concentration of ammonium pentaborate is not critical and is preferably near its limit of solubility in water since this provides the maximum amount of boron consistent with uniform distribution of boron throughout the shielded zone. The selection of the jelling agent is not critical. Jelling agents typically useful in drilling muds such as polyacrylamides, inorganic silica sols, and gelatine may be used. The high viscosity fluid is necessary at the lower depths to prevent collapse of the drilling hole, and to prevent the fluid from migrating into the surrounding rock formation.

The ammonium pentaborate is dissolved in the water before the jelling agent is added. Since ammonium pentaborate is highly soluble in cold water, boron, a very good neutron-absorbing substance, is uniformly distributed in the resultant mud composition. Conventional techniques and apparatus for pumping drilling mud into the drill hole may be used. The mud composition is then disposed so as to envelop and underground nuclear explosive device and thereby act as a neutron-absorbing shield, reducing the amount of radioactive isotopes produced by neutron interaction with constituent elements of the surrounding soil.

Example

A typical base mud is one composed of about 25% by weight of bentonite in water. To each 100 grams of base mud is added approximately 5 grams of ammonium pentaborate. To this mixture, approximately 4 grams of anhydrous silica aerogel is added as a jelling agent.

The composition is then pumped into the desired drill hole using conventional means. A sufficient amount of the mud, approximately 25 to 30 gallons, is pumped to the depth of the nuclear explosive so as to provide an enveloping shield of approximately 20 cm. thickness around the explosive device.

What is claimed is:

1. A drilling mud composition consisting of ammonium pentaborate, water, and a jelling agent, wherein the concentration of ammonium pentaborate is about 5 percent by weight.

References Cited

UNITED STATES PATENTS

| | | | |
|---|---|---|---|
| 2,452,021 | 10/1948 | Wayne | 252—8.5 |
| 3,126,352 | 3/1964 | Blair et al. | 250—518 |
| 2,455,188 | 11/1948 | Oxford | 252—8.5 |

HERBERT B. GUYNN, Primary Examiner

U.S. Cl. X.R.

61—35; 166—247; 252—8.5 A, 8.55 R, 478